(12) United States Patent
Ross et al.

(10) Patent No.: US 10,794,442 B2
(45) Date of Patent: Oct. 6, 2020

(54) ELECTROMECHANICAL ACTUATOR PACKAGE WITH MULTI-STAGE BELT DRIVE MECHANISM

(71) Applicant: MANDO CORPORATION, Pyeongtaek-si (KR)

(72) Inventors: Kevin Ross, Hemlock, MI (US); Troy Strieter, Sebewaing, MI (US); Joshua Grove, Sanford, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 84 days.

(21) Appl. No.: 16/118,437

(22) Filed: Aug. 31, 2018

(65) Prior Publication Data
US 2019/0242448 A1  Aug. 8, 2019

Related U.S. Application Data

(60) Provisional application No. 62/627,114, filed on Feb. 6, 2018, provisional application No. 62/634,140, filed
(Continued)

(51) Int. Cl.
*F16D 65/16* (2006.01)
*B60T 13/74* (2006.01)
(Continued)

(52) U.S. Cl.
CPC ............ *F16D 65/16* (2013.01); *B60T 13/746* (2013.01); *F16D 2121/24* (2013.01); *F16D 2125/48* (2013.01); *F16H 7/02* (2013.01)

(58) Field of Classification Search
CPC ...... H02K 7/1004; H02K 7/10; H02K 11/215; F16D 65/16; F16D 65/18; F16D 2121/24;
(Continued)

(56) References Cited

U.S. PATENT DOCUMENTS 6,837,357 B2 * 1/2005 Peter .................... B60T 13/746
                                                                188/157
8,186,488 B2 * 5/2012 Poertzgen ............ B60T 13/746
                                                                188/162
(Continued)

FOREIGN PATENT DOCUMENTS

CN          203509739       4/2014
DE     10 2004 012 355      9/2004
(Continued)

OTHER PUBLICATIONS https://www.engineeringtoolbox.com/pulley-diameters-speeds-d_1620.html) (Year: 2020).*
(Continued)

*Primary Examiner* — Burton S Mullins
(74) *Attorney, Agent, or Firm* — Ladas & Parry, LLP

(57) ABSTRACT

A electromechanical actuator package for actuating a brake assembly may comprise: a motor comprising a motor rotor shaft on which a drive pulley is formed; a multi-stage belt drive mechanism connecting the motor rotor shaft to an actuator output via a plurality of drive belts, the actuator output associated with the brake assembly; a circuit board; and a housing enclosing the motor, the multi-stage belt drive mechanism and the circuit board, wherein the circuit board is positioned between one end of the motor rotor shaft and an inner surface of the housing. The electromechanical actuator package may improve mechanical efficiency as well as reduce the packaging size and mass. Further, the electromechanical actuator package may reduce operational noise.

20 Claims, 4 Drawing Sheets

Related U.S. Application Data on Feb. 22, 2018, provisional application No. 62/627,116, filed on Feb. 6, 2018.

(51) Int. Cl.
*F16H 7/02* (2006.01)
*H02K 7/102* (2006.01)
*F16D 121/24* (2012.01)
*F16D 125/48* (2012.01)

(58) Field of Classification Search
CPC ............ F16D 2121/26; F16D 2125/48; B60T 13/746; G01D 5/142
USPC .......................................................... 474/84
See application file for complete search history.

(56) References Cited

U.S. PATENT DOCUMENTS

| | | | | |
|---|---|---|---|---|
| 9,145,950 | B2* | 9/2015 | Dettenberger | .......... F16D 65/28 |
| 9,410,590 | B2* | 8/2016 | Jang | ...................... H02K 7/116 |
| 9,500,240 | B2* | 11/2016 | Fuse | ...................... F16D 55/226 |
| 10,001,182 | B2* | 6/2018 | Zhang | ...................... F16D 65/16 |
| 2007/0063603 | A1 | 3/2007 | Levine et al. | |
| 2013/0237353 | A1* | 9/2013 | Scholten | ................ B62D 5/006 474/114 |
| 2016/0200294 | A1* | 7/2016 | Takeo | ................... B60T 13/741 188/156 |
| 2019/0023248 | A1* | 1/2019 | Yasui | ...................... B60T 13/02 |

FOREIGN PATENT DOCUMENTS

| | | | | |
|---|---|---|---|---|
| DE | 102006036183 | * | 2/2008 | ............. B62D 1/181 |
| DE | 102014015848 A1 | * | 4/2016 | ............. F16D 65/22 |
| JP | 1-285233 | | 11/1989 | |
| JP | 06117505 | * | 4/1994 | ............... F16H 7/02 |
| JP | 2006-27580 | | 2/2006 | |
| JP | 2006-520453 | | 9/2006 | |
| JP | 2017128285 | * | 7/2017 | ............. B60T 13/74 |
| KR | 10-2009-0130601 | | 12/2009 | |
| KR | 10-2015-0072582 | | 6/2015 | |
| WO | WO008504796 | * | 11/1985 | ............... A61F 2/58 |
| WO | 2004/044445 | | 5/2004 | |

OTHER PUBLICATIONS

Office Action dated May 13, 2019 for European Patent Application No. 19155421.1-1012.

* cited by examiner

ELECTROMECHANICAL ACTUATOR PACKAGE WITH MULTI-STAGE BELT DRIVE MECHANISM

CROSS REFERENCE TO PARENT APPLICATIONS

This application claims the benefit of U.S. Patent Application Ser. No. 62/627,114, filed on Feb. 6, 2018, entitled "ELECTRIC BRAKE AND CALIPER—DUAL STAGE BELT DRIVE MECHANISM"; U.S. Patent Application Ser. No. 62/634,140, filed on Feb. 22, 2018, entitled "PULLEY INTEGRAL TYPE SHAFT"; and U.S. Patent Application Ser. No. 62/627,116, filed on Feb. 6, 2018, entitled "STEER-BY-WIRE HANDWHEEL ACTUATOR—BELT DRIVE MECHANISM", which are all hereby incorporated by reference in their entireties.

CROSS REFERENCE TO RELATED PATENT APPLICATIONS

This application is related to U.S. patent application Ser. No. 16/118,432, entitled "MOTOR WITH PULLEY MACHINED ON SHAFT AND BRAKE AND STEERING ASSEMBLIES INCLUDING THE SAME", filed on Aug. 31, 2018; and U.S. patent application Ser. No. 16/118,434, entitled "ELECTROMECHANICAL ACTUATOR PACKAGE WITH BELT DRIVE MECHANISM FOR STEER-BY-WIRE HAND WHEEL ACTUATOR", filed on Aug. 31, 2018. All of these applications are incorporated herein by reference in their entireties.

TECHNICAL FIELD

Some embodiments of the present disclosure relate to electrically actuated brake systems and, in particular, to an electromechanical actuator package having a multi-stage belt mechanism to drive a brake assembly, for example, but not limited to, a brake caliper.

BACKGROUND

A brake system for a motor vehicle, and in particular an automotive vehicle, functionally reduces the speed of the vehicle or maintains the vehicle in a rest position. Various types of brake systems are commonly used in automotive vehicles, including hydraulic, anti-lock or "ABS," and electric or "brake by wire." For example, in a hydraulic brake system, the hydraulic fluid transfers energy from a brake pedal to a brake pad for slowing down or stopping rotation of a wheel of the vehicle. Electronics control the hydraulic fluid in the hydraulic brake system. In the electric brake system, the application and release of the brake is controlled by an electric caliper via electrical signal.

These electric brake systems typically include an electromechanical actuator connected to a brake caliper either by a cable, as the drum in head, or directly attached to the brake caliper. The actuator converts electrical power to rotational mechanical output power for moving the cable or drive screw and applying the brakes. Generally, the electro-mechanical actuator includes a motor and a gear system. Typically, either a few large gears or many small gears for the gear system are needed to achieve the necessary load transfer.

It would be desirable to have an apparatus and method that take into account some of the issues discussed above, as well as other possible issues.

SUMMARY

The features and advantages of the present disclosure will be more readily understood and apparent from the following detailed description, which should be read in conjunction with the accompanying drawings, and from the claims which are appended to the end of the detailed description.

Accordingly to some embodiments of the present disclosure, a electromechanical actuator package for actuating a brake assembly may comprise: a motor comprising a motor rotor shaft; a multi-stage belt drive mechanism connecting the motor rotor shaft to an actuator output via a plurality of drive belts, the actuator output associated with the brake assembly; a circuit board; and a housing enclosing the motor, the multi-stage belt drive mechanism and the circuit board, wherein the circuit board is positioned between one end of the motor rotor shaft and an inner surface of the housing.

According to certain embodiments of the present disclosure, a drive pulley of the motor rotor shaft may be directly machined on a circumferential surface of the motor rotor shaft.

According to some embodiments of the present disclosure, the multi-stage belt drive mechanism may comprise: a first stage drive belt; a first stage driven pulley connected to the drive pulley of the motor rotor shaft via the first stage drive belt; a connecting shaft connecting the first stage driven pulley to a second stage drive pulley; a second stage drive belt; the second stage drive pulley connected to a second stage driven pulley via the second stage drive belt; and the second stage driven pulley associated with the actuator output.

A better understanding of the nature and advantages of the present disclosure may be gained with reference to the detailed description and the drawings below.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1A:
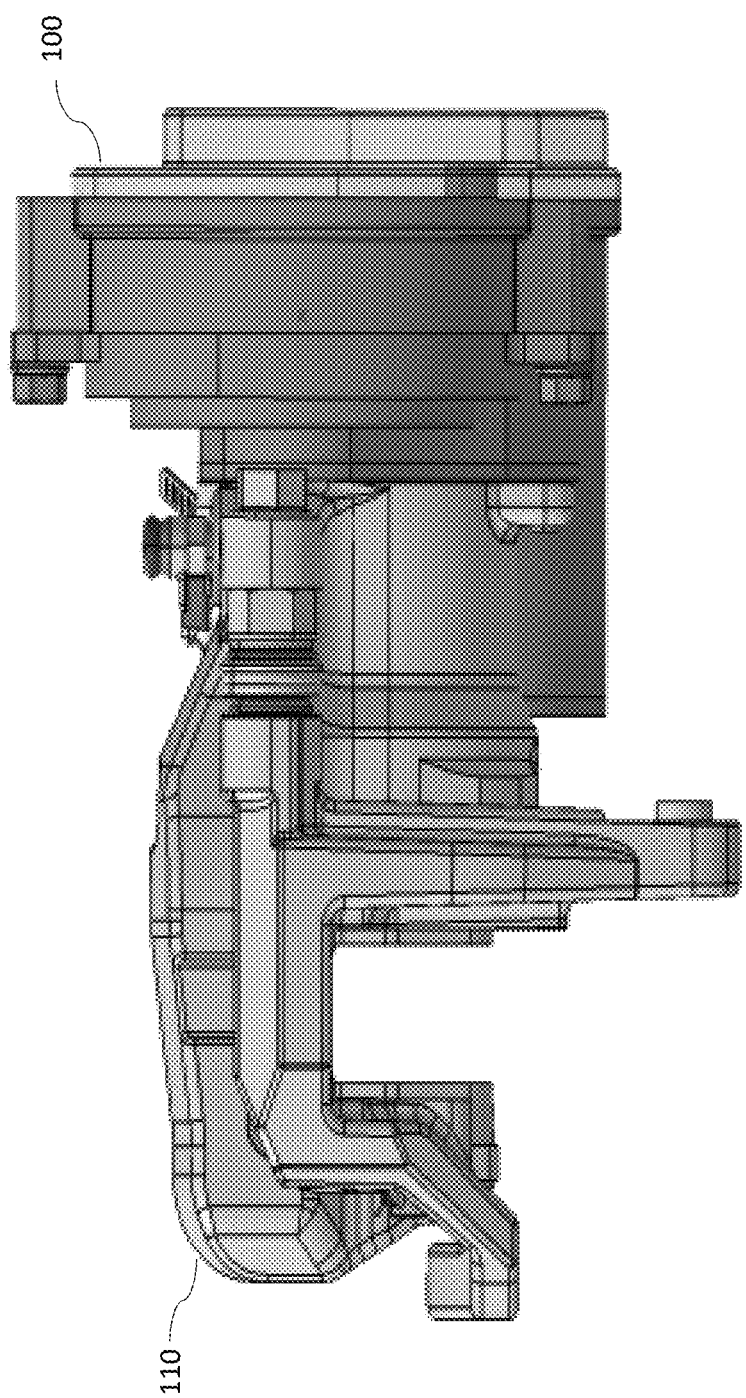
FIG. 1A shows a side view of an electromechanical actuator package coupled to a brake assembly according to an exemplary embodiment of the present disclosure.
Figure 1B:
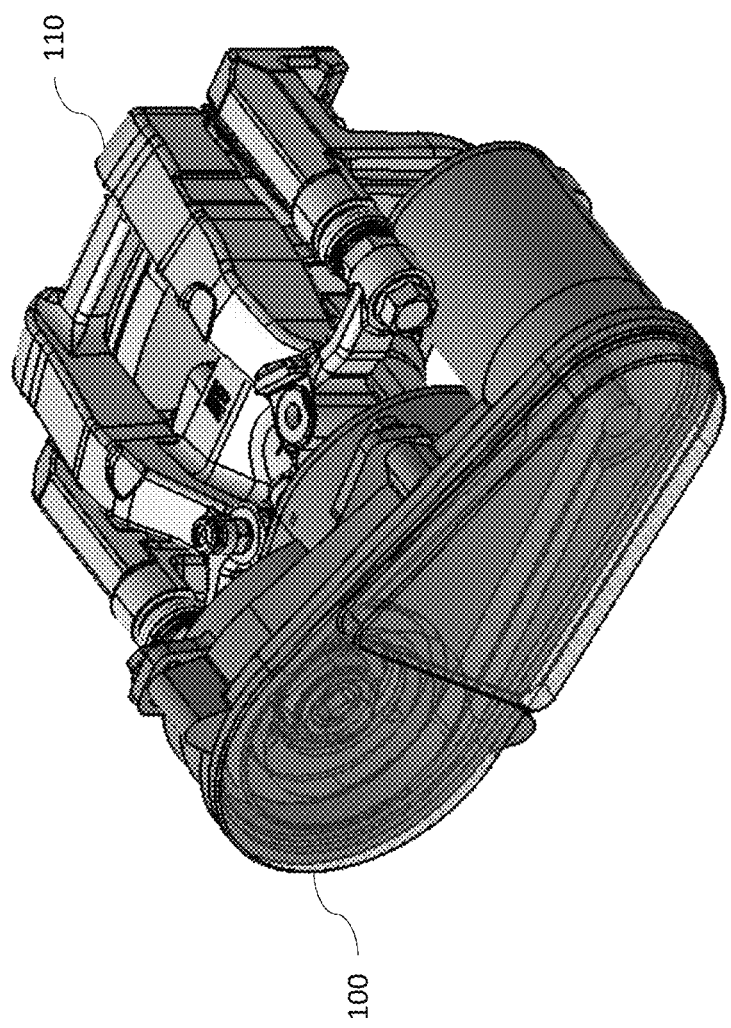
FIG. 1B shows a top perspective view of an electromechanical actuator package coupled to a brake assembly according to an exemplary embodiment of the present disclosure.

FIGS. 1A and 1B illustrate an exemplary embodiment where an electromechanical actuator package is coupled to a brake assembly. As shown in FIG. 1, an electromechanical actuator package 100 may be directly mounted or indirectly connected to a brake assembly, for example, but not limited to, a brake caliper 110. The electromechanical actuator package 100 may be configured to actuate or drive the brake caliper 110. The electromechanical actuator package 100 can supply braking force to the brake caliper 110 through an actuator output 260 of FIG. 2. The electromechanical actuator package 100 may be coupled to the brake caliper 110 for applying the brakes using a variety of ways. For example, the actuator output 260 of FIG. 2 of the electromechanical actuator package 100 may be attached to a ball screw mechanism of the brake caliper 110 to generate axial force for actuating a brake. The electromechanical actuator package 100 may be mounted to any suitable portion of a vehicle, including frame, body, and trim components.

Figure 2A:
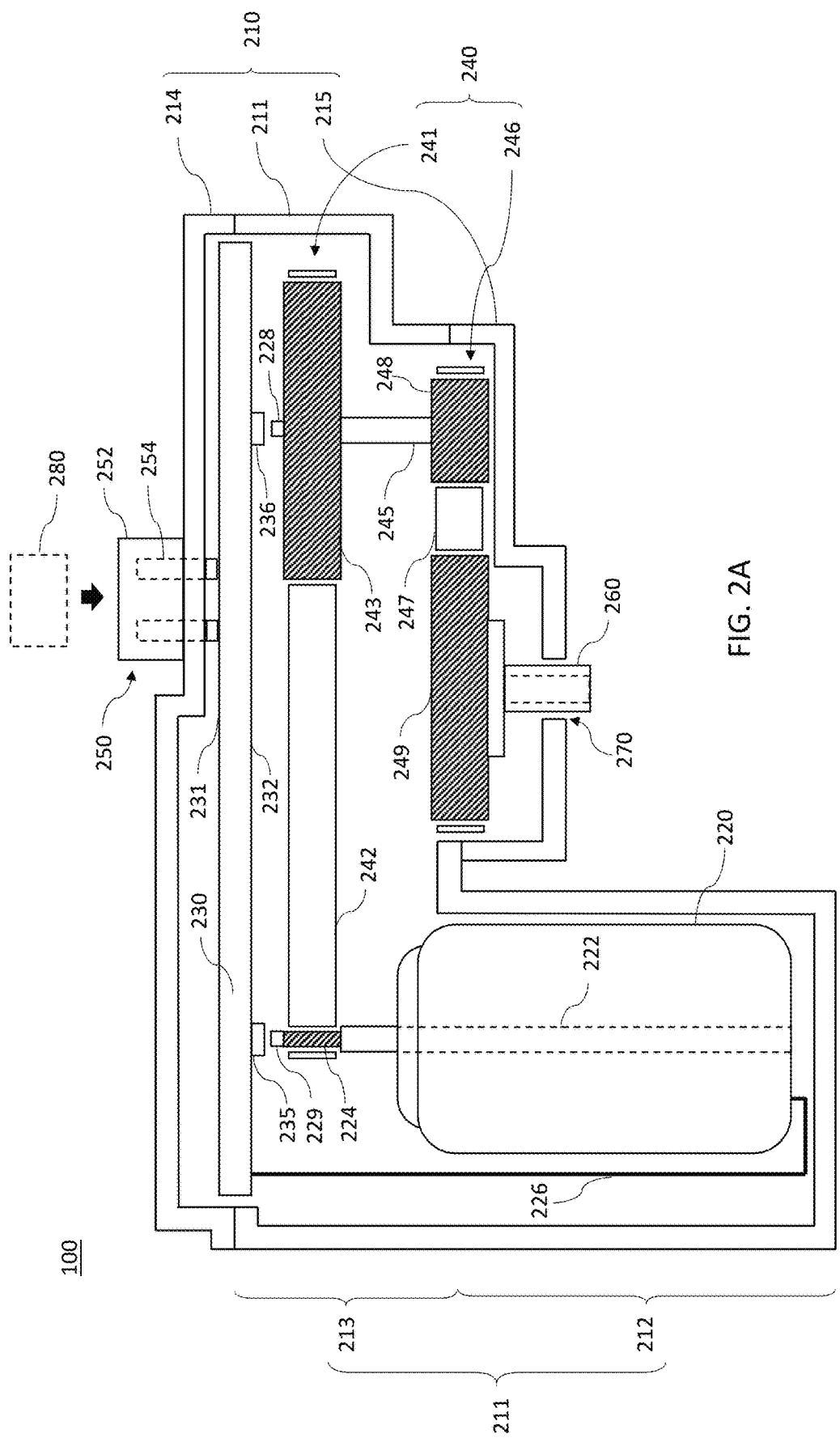
FIG. 2A shows a cross-sectional view of an electromechanical actuator package according to an exemplary embodiment of the present disclosure.
Figure 2B:
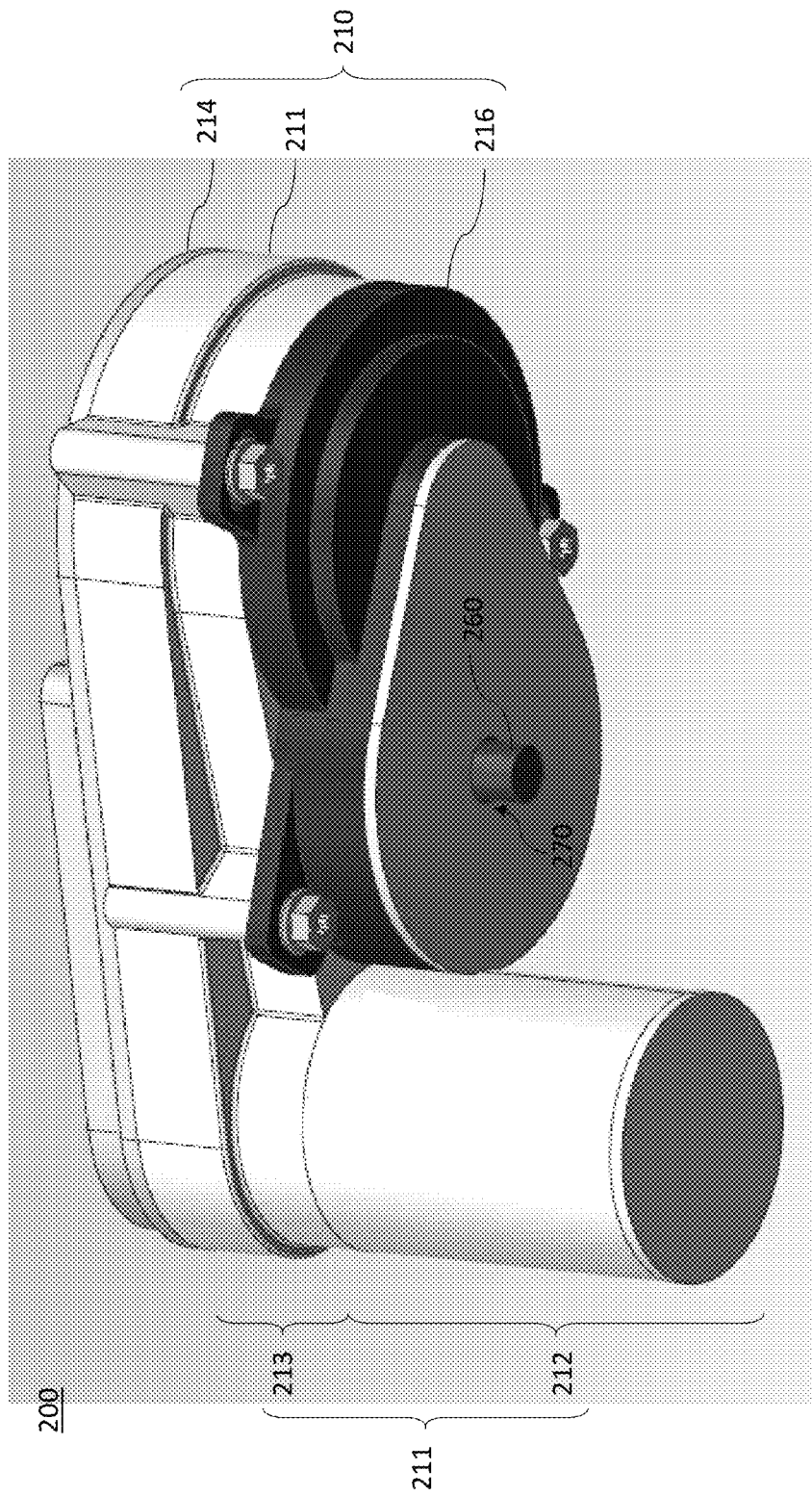
FIG. 2B shows a perspective view of an electromechanical actuator package according to an exemplary embodiment of the present disclosure.

FIG. 2A shows a cross-sectional view of an electromechanical actuator package according to an exemplary embodiment of the present disclosure. FIG. 2B shows a perspective view of an electromechanical actuator package according to an exemplary embodiment of the present disclosure.

A motor 220 may be fixedly mounted in a housing 210. The motor 220 may be disposed in the tubular cavity formed in the housing 210 and be fixed to a lower part of the housing 210. The motor 220 may an electric motor, and includes a motor rotor shaft 222 axially extending toward a circuit board 230. The motor 220 may be electrically connected to the circuit board 230 and/or an electric connector 250 via one or more electrical conductors 226. The electrical conductors 226 may connect the motor 220 to appropriate terminals on the circuit board 230 or the electric connector 250. The motor 220 may be actuated and controlled by the circuit board 230 for providing the desired rotational speed and rotational direction of the motor rotor shaft 222 of the motor 220. Alternatively, the motor 220 may be electrically connected to an external device via the electric connector 250 and be actuated and/or controlled by the external device, such as a controller disposed outside of the electromechanical actuator package 100 and/or an external power supplier, via the electric connector 250 and be actuated and/or controlled by the external device.

The drive pulley 224 may be formed directly on the motor rotor shaft 222 or attached to the motor rotor shaft 222. In an exemplary embodiment, the drive pulley 224 may be directly machined on the circumferential surface of the motor rotor shaft 222 to be coupled with the drive belt 242. For example, the drive pulley 224 may be formed on or adjacent to a distal end of the motor rotor shaft 222. The drive pulley 224 may be directly splined on the surface of the motor rotor shaft 222. The drive pulley 224 may have an outer surface that engages an inner surface of the drive belt 242. The outer surface of the drive pulley 224 can have any suitable contour or texture to help ensure a gripping contact between the drive belt 242 and the drive pulley 224. For example, the outer surface of the toothed pulley 224 and the inner surface of the drive belt 242 can include toothed mating protrusions and/or notches formed therein. The drive pulley 224 may have alternating teeth and grooves on its outer surface to be meshed with alternating grooves and teeth formed on the inner surface of the drive belt 242. For example, the motor rotor shaft 222, the drive pulley 224 and the drive belt 242 may utilize aspects described in U.S. patent application Ser. No. 16/118,432, entitled "MOTOR WITH PULLEY MACHINED ON SHAFT AND BRAKE AND STEERING ASSEMBLIES INCLUDING THE SAME", filed on Aug. 31, 2018, which are all hereby incorporated herein by reference in their entireties. In another embodiment, instead of machining the drive pulley 224 on the circumferential surface of the motor rotor shaft 222, the drive pulley 224 may be mounted to and pressed in the motor rotor shaft 222 as a separate piece from the motor rotor shaft 222.

The drive pulley 224 of the motor rotor shaft 222 is rotatably engaged with a multi-stage belt drive mechanism 240. In the exemplary embodiment, the multi-stage belt drive mechanism 240 may be a dual-stage belt drive mechanism comprising a first stage belt assembly 241 and a second stage belt assembly 246. The multi-stage belt drive mechanism 240 may be configured to multiply torque from the motor 220 to supply braking force to the brake caliper 110 via the actuator output 260.

The first stage belt assembly 241 may comprise a first stage drive belt 242 and a first stage driven pulley 243. The drive pulley 224 of the motor rotor shaft 222 and the first stage driven pulley 243 of the multi-stage belt drive mechanism 240 are rotatably connected to each other via the first stage drive belt 242. Each of the drive pulley 224 and the first stage driven pulley 243 has an outer surface that engages an inner surface of the first stage drive belt 242. The surfaces of the drive pulley 224 and the first stage driven pulley 243 can have any suitable contour or texture to help ensure a gripping contact between the belt 242 and the pulleys 224, 243. For example, the surfaces of the pulleys 224 and 243 and the inner surface of the belt 242 can include toothed mating protruding and/or notches formed therein.

The first stage drive belt 242 is fit relatively snugly about the outer circumferences of the drive pulley 224 and the first stage driven pulley 243. Thus, rotational movement of the drive pulley 224 of the motor rotor shaft 222 causes rotation of the first stage driven pulley 243 of the dual-stage belt drive mechanism 240. The diameters of the pulleys 224 and 243 can be any suitable dimension for providing any desired gear ratio, such that the rotational speed of the drive pulley 224 of the motor rotor shaft 222 is different from the rotational speed of the first stage driven pulley 243 of the multi-stage belt drive mechanism 240. For example, the diameter of the first stage driven pulley 243 is equal to or greater than 7 times the diameter of the drive pulley 224 of the motor rotation shaft 222.

The first stage drive belt 242 may be made from any suitable material or combination of materials flexible enough to loop around the pulleys 224 and 243 and maintain engagement with the outer surfaces of the pulleys 224 and 243 during rotation thereof. The first stage drive belt 242 may be a vee belt or a cog belt, or may be made of individual links forming a chain. The first stage drive belt 242 may be made of an elastomeric material, and may include internal metallic reinforcing members.

The multi-stage belt drive mechanism 240 may further comprise a connecting shaft 245 connecting the first stage belt assembly 241 to second stage belt assembly 246. For example, the connecting shaft 245 may connect the first stage driven pulley 243 of the first stage belt assembly 241 to the second stage drive pulley 248 of the second stage belt assembly 246 in order to deliver torque of the first stage driven pulley 243 to the second stage drive pulley 248. The diameters of the first stage driven pulley 243 of the first stage belt assembly 241 and the second stage drive pulley 248 of the second stage belt assembly 246 may be any suitable dimension for providing the optimized reduction ratio and motor output torque. In the exemplary embodiment, the diameter of the first stage driven pulley 243 is larger than the diameter of the second stage drive pulley 248. The connecting shaft 245 may be positioned substantially axially parallel to the motor rotor shaft 222, however the orientation of the connecting shaft 245 may be altered.

In operation, the first stage belt assembly 241 multiplies the torque from the motor 220 by using the drive pulley 224 of the motor 220 and the first stage driven pulley 243 of the first stage belt assembly 241 rotatably connected by the first stage drive belt 242, and the torque multiplied by the first stage belt assembly 241 is delivered to the second stage belt assembly 246 by the connecting shaft 245.

The multi-stage belt drive mechanism 240 may further include the second stage belt assembly 246. The second stage belt assembly 246 may comprise a second stage drive belt 247, the second stage drive pulley 248 and a second stage driven pulley 249. The second stage belt assembly 246 may be configured to further multiply the torque delivered from the first stage belt assembly 241 and provide the multiplied torque to the actuator output 260. The second stage drive pulley 248 and the second stage driven pulley 249 are rotatably connected to each other via the second stage drive belt 247. Each of the second stage drive pulley 248 and the second stage driven pulley 249 has an outer surface that engages an inner surface of the second stage drive belt 247. The surfaces of the second stage drive pulley 248 and the second stage driven pulley 249 can have any suitable contour or texture to help ensure a gripping contact between the belt 247 and the pulleys 248, 249. For example, the surfaces of the pulleys 248 and 249 and the inner surface of the belt 247 can include toothed mating protrusions and/or notches formed therein.

The second stage drive belt 247 is fit relatively snugly about the outer circumferences of the second stage drive pulley 248 and the second stage driven pulley 249. Thus, rotational movement of the second stage drive pulley 248 causes rotation of the second stage driven pulley 249. The diameters of the pulleys 248 and 249 can be any suitable dimension for providing any desired gear ratio, such that the rotational speed of the second stage drive pulley 248 is different from the rotational speed of the second stage driven pulley 249.

The second stage drive belt 247 may be made from any suitable material or combination of materials flexible enough to loop around the pulleys 248 and 249 and maintain engagement with the outer surfaces of the pulleys 248 and 249 during rotation thereof. The second stage drive belt 247 may be a vee belt or a cog belt, or may be made of individual links forming a chain. The second stage drive belt 247 may be made of an elastomeric material, and may include internal metallic reinforcing members.

The second stage driven pulley 249 may be associated with the actuator output 260. The actuator output 260 may be formed directly on a side of the second stage driven pulley 249 or fixedly coupled to the second stage driven pulley 249. The actuator output 260 may have various shapes that can be coupled to a part of the brake assembly. For example, the actuator output 260 may be formed as a protrusion extending from one side of the second stage driven pulley 249, such as a toothed, threaded or splined shaft to prevent or minimize rotational lash. Alternatively, the actuator output 260 may be formed as a toothed, threaded or splined bore that can receive a part of the brake assembly to prevent or minimize rotational lash. In the exemplary embodiment, the actuator output 260 of the electromechanical actuator package 100 may be attached to a ball screw mechanism of the brake caliper 110 to generate axial force for actuating a brake.

The output torque from the actuator output 260 may be adjusted or scalable depending on the specific force torque requirements by varying the torque of the motor 220, the diameters of the pulleys 224, 243, 248 and 249, and/or the belt reduction ratio. The belt ratio (or 1/diameter ratio or speed ratio) between the drive pulley 224 of the motor rotor shaft 222 and the actuator output 260 may be equal to or greater than, for example, but not limited to, 1:25. According to the embodiment of the present disclosure, the multi-stage belt drive mechanism 240 may improve mechanical efficiency as well as reduce the packaging size and mass. Furthermore, the multi-stage belt drive mechanism 240 may reduce operational noise.

The circuit board 230 may be mounted inside of the housing 210. In the exemplary embodiment, the circuit board 230 may be fully contained within the housing 210. The circuit board 230 may be installed between one end of the motor rotation shaft 222, for example, but not limited to, a distal end of the motor rotation shaft 222 or the drive pulley 224 of the motor rotation shaft 222, and the inner surface of the circuit board 230. For example, the circuit board 230 may be disposed in the uppermost portion of the housing 210. The circuit board 230 may be arranged generally perpendicular to the axis of the motor rotation shaft 222, although it is not required. The circuit board 230 can be retained in the housing 210 by any suitable manner, such as by a plurality of clips or snaps integrally formed in the housing 210 or screws.

The circuit board 230 may comprise any suitable circuitry and electronic components, such as a microprocessor, mounted thereon. The circuit board 230 may be configured to control the motor 220, for example, but not limited to, supply power to the motor 220, activate or deactivate the operation of the motor 220, and vary the speed of the motor 220 and/or the rotational direction of the motor 220. The circuit board 230 may have a first and second opposed sides 231 and 232. The first side 231 of the circuit board 230 faces the inner (upper) surface of the housing 210. The second side 232 of the circuit board 230 faces the motor 220 and/or the multi-stage belt drive mechanism 240. The circuitry and electronic components can be mounted on either of the sides 231 and 232, or on both the sides 231 and 232.

A motor position sensor 235 is supported on the circuit board 230, and is electrically connected with the circuit board 230. For example, the motor position sensor 235 is directly mounted on the second side 232 of the circuit board 230 facing the distal end of the motor rotation shaft 222. Because the motor position sensor 235 is supported on the circuit board 230, the motor position sensor 235 can be easily electrically connected to the circuitry of the circuit board 230 without the need of a separate lead frame. The motor position sensor 235 can be directly connected to the circuit board 230, such as by soldering or by any other suitable method.

The motor position sensor 235 may be disposed in sensing relationship with the motor rotor shaft 222. For example, the motor position sensor 235 may be positioned adjacent to the distal end of the motor rotation shaft 222.

The motor position sensor 235 is responsive to the rotation of the motor rotation shaft 222. For example, the motor position sensor 235 and the motor rotation shaft 222 are configured such that the motor position sensor 235 can detect the rotational speed of the motor rotation shaft 222 and/or the rotational direction of the motor rotation shaft 222. Furthermore, the motor position sensor 235 and the motor rotation shaft 222 may be configured such that the motor position sensor 235 can detect the angular position of the motor rotation shaft 222. The motor position sensor 235 may generate an output signal indicative of the detected status of the motor 220.

The motor position sensor 235 and the motor rotation shaft 222 can be any suitable device(s) for generating signal responsive to the rotation of the motor rotation shaft 222. For example, the motor position sensor 235 can be a non-contact limit switch. The motor position sensor 235 may be a Hall effect sensor. Correspondingly, the motor rotation shaft 222 may include a magnetic gradient 229 formed on a surface of the motor rotation shaft 222 defined by a plurality of alternating north and south magnetically charged elements circumferentially spaced about the circumference of the motor rotation shaft 222. The magnetically charged elements 229 of the motor rotation shaft 222 can be any suitable component or material capable of retaining a magnetic charge. The magnetically charged elements 229 of the motor rotation shaft 222 can be formed and/or mounted on the surface of the motor rotation shaft 222 or can be disposed internally in the motor rotation shaft 222. For example, the magnet 229 for sensing the motor position may be pressed on the end of the motor rotation shaft 222.

The electromechanical actuator package 100 may further comprise a shaft position sensor (or a redundant motor position sensor) 236. The redundant motor position sensor 236 may be supported on the circuit board 230, and is electrically connected with the circuit board 230. For example, the shaft position sensor 236 is directly mounted on the second side 232 of the circuit board 230 facing the distal end of the motor rotation shaft 222. Because the shaft position sensor 236 is supported on the circuit board 230, the shaft position sensor 236 can be easily electrically connected to the circuitry of the circuit board 230 without the need of a separate lead frame. The shaft position sensor 236 can be directly connected to the circuit board 230, such as by soldering or by any other suitable method.

The shaft position sensor 236 may be disposed in sensing relationship with the connecting shaft 245 (and/or the first stage driven pulley 243). For example, the shaft position sensor 236 may be positioned adjacent to one end of the connecting shaft 245 (and/or the first stage driven pulley 243) facing the circuit board 230.

The shaft position sensor 236 is responsive to the rotation of the connecting shaft 245 (and/or the first stage driven pulley 243). For example, the redundant motor position sensor 236 and the connecting shaft 245 (and/or the first stage driven pulley 243) are configured such that the redundant motor position sensor 236 can detect the rotational speed of the connecting shaft 245 (and/or the first stage driven pulley 243) and/or the rotational direction of the connecting shaft 245 (and/or the first stage driven pulley 243). Furthermore, the shaft position sensor 236 and the connecting shaft 245 (and/or the first stage driven pulley 243) may be configured such that the shaft position sensor 236 can detect the angular position of the connecting shaft 245 (and/or the first stage driven pulley 243). The shaft position sensor 236 may generate an output signal indicative of the detected status of the connecting shaft 245 (and/or the first stage driven pulley 243).

The redundant motor position sensor 236 and the connecting shaft 245 (and/or the first stage driven pulley 243) can be any suitable device(s) for generating signal responsive to the rotation of the connecting shaft 245 (and/or the first stage driven pulley 243). For example, the redundant motor position sensor 236 can be a non-contact limit switch. The redundant motor position sensor 236 may be a Hall effect sensor. Correspondingly, the connecting shaft 245 and/or the first stage driven pulley 243 may include a magnetic gradient 228 formed on a surface of the connecting shaft 245 and/or the first stage driven pulley 243 defined by a plurality of alternating north and south magnetically charged elements circumferentially spaced about the circumference of the connecting shaft 245 and/or the first stage driven pulley 243. The magnetically charged elements 228 of the connecting shaft 245 and/or the first stage driven pulley 243 can be any suitable component or material capable of retaining a magnetic charge. The magnetically charged elements 228 of the connecting shaft 245 and/or the first stage driven pulley 243 can be formed and/or mounted on the surface of the connecting shaft 245 and/or the first stage driven pulley 243 or can be disposed internally in the connecting shaft 245 and/or the first stage driven pulley 243. For example, the magnet 228 for sensing the motor position may be pressed on the end of the connecting shaft 245 and/or the first stage driven pulley 243.

By using the signals generated by the motor position sensor 235 and/or the redundant motor position sensor 236, the failure of the belt 242 can be detected by, for example, but not limited to, the circuit board 230 or the controller disposed outside of the package 100.

The housing 210 may have one or more of planar and circular surfaces, openings for shafts and bearings and various recesses, shoulders, flanges, counterbores and the like to receive various components and assemblies of the electromechanical actuator package 100. Numerous different materials may suitably be used for the various components of the housing 210. For example, the housing 210 may be die cast of metal such as aluminum. In another example, the housing 210 may be formed from a polymeric material. Alternatively, the housing 210 may be formed from any other suitable strong and relatively light weight material.

The housing 210 may comprise a housing body 211, a first cover 214 and a second cover 215. The housing body 211 may enclose at least a portion of the motor 220. The housing body 211 may comprise a vertical housing portion 212 and a planar housing portion 213. The annular housing portion 212 and the planar housing portion 213 may be formed as a single piece or may be formed as multiple pieces coupled together. The vertical housing portion 212 defines a motor cavity receiving at least a portion of the motor 220. The vertical housing portion 212 may extend from the planar housing portion 213 in a direction perpendicular to a plane of the planar housing portion 213. The vertical housing portion 212 may have a cylindrical hollow shape, although it is not required. The planar housing portion 213 may define a cavity receiving at least a portion of the multi-stage belt drive mechanism 240. Furthermore, the planar housing portion 213 may define a cavity receiving at least a portion of the circuit board 230, although it is not required.

The first cover 214 may be affixed to one side of the housing body 211 (e.g. the upper side of the housing body 211). The first cover 214 may be secured to the housing body 211 using securement means, such as screws, snaps, clips or the like. The first cover 214 enables assembly of or access to the circuit board 230. The first cover 214 may enclose a portion of the circuit board 230 or may cover the first side 231 of the circuit board 230. The second cover 215 may be affixed to the other side of the housing body 211 (e.g. the lower side of the housing body 211) which is opposite to the side of the housing body 211 where the first cover 214 is affixed.

The second cover 215 may be secured to the housing body 211 using securement means, such as screws, snaps, clips or the like. The second cover 215 enables assembly of or access to the multi-stage belt drive mechanism 240. The second cover 215 may enclose a portion of the multi-stage belt drive mechanism 240. Although the first cover 214 and the second cover 215 are described as a separate part from the housing body 211, the first cover 214 and/or the second cover 215 may be integrally formed with the housing body 211 as one single piece. The second cover 215 may have a hole or opening 270 for the actuator output 260. The actuator output 260 may extend outwardly from the second cover 215 through the hole or opening 270 of the second cover 215. Alternatively, the actuator output 260 may be disposed inside the housing 210 and a part of the brake caliper 110 may be coupled to the actuator output 260 through the hole or opening 270 of the second cover 215.

The housing 210 can have any suitable shape for housing the components of the electromechanical actuator package 100 and may be formed separately or in combination and can have multiple number of parts. The housing 210 may fully enclose the motor 220, the circuit board 230 and the multi-stage belt drive mechanism 240 as a one single package. Accordingly, the exemplary embodiment may provide a modular "bolt-on" design. In another exemplary embodiment, the electromechanical actuator package 100 may be fully integrated into the brake caliper 110 of FIGS. 1A and 1B.

The housing 210 may further comprise the electric connector 250 capable of receiving and connecting with a connecting part 280 of an external device for supplying power to the circuit board 230 and/or the motor 220 and/or for electrically communicating with the circuit board 230 and/or the motor 220. The electric connector 250 may comprise a connector housing 252 having a structure for receiving and connecting with the connecting part 280 of the external device. The connector housing 252 may be formed with the housing 210 as one single piece, for example, but not limited to, by molding. Alternatively, the connector housing 252 may be a separate part from the housing 210 and be secured to the housing 210. One or more electrical conductors 254 may extend from the connector housing 252 to the circuit board 230. A portion of the electrical conductors 254 may be disposed outside of the housing 210 and the connector housing 252 to be contacted with an electrical conductor of the connecting part 280 of the external device. The electric connector 250 may be either a male or female type connector. One end of the electrical conductors 254 of the connector housing 252 may be formed as a connector pin, plug or socket. The other end of the electrical conductors 254 may be connected to the circuit board 230 and/or the motor 220. For example, an electrical energy source, e.g. the vehicle battery, or an electronic control unit (ECU) may be connected to the circuit board 230 and/or the motor 220 via the connector pin in the connector housing 252.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. An electromechanical actuator package for actuating a brake assembly, comprising:
    a motor comprising a motor rotor shaft;
    a multi-stage belt drive mechanism connecting the motor rotor shaft to an actuator output via a plurality of drive belts, the actuator output associated with the brake assembly;
    a circuit board; and
    a housing enclosing the motor, the multi-stage belt drive mechanism and the circuit board, wherein the circuit board is positioned between one end of the motor rotor shaft and an inner surface of the housing,
    wherein:
    the multi-stage belt drive mechanism comprises a first stage belt drive assembly, a second stage belt drive assembly, and a connecting shaft operably connecting the first stage belt drive assembly to the second stage belt drive assembly, and
    the electromechanical actuator package further comprises a shaft position sensor configured to sense a position of the connecting shaft and/or a pulley fixed to the connecting shaft, the shaft position sensor disposed on the circuit board and facing one end of the connecting shaft and/or the pulley fixed to the connecting shaft.

2. The electromechanical actuator package of claim 1, wherein the motor rotor shaft comprises a drive pulley, and wherein the multi-stage belt drive mechanism comprises:
    a first stage drive belt;
    a first stage driven pulley connected to the drive pulley of the motor rotor shaft via the first stage drive belt;
    the connecting shaft connecting the first stage driven pulley to a second stage drive pulley;
    a second stage drive belt;
    the second stage drive pulley connected to a second stage driven pulley via the second stage drive belt; and
    the second stage driven pulley associated with the actuator output.

3. The electromechanical actuator package of claim 2, wherein the driven pulley of the motor rotor shaft is machined on a circumferential surface of the motor rotor shaft.

4. The electromechanical actuator package of claim 2, wherein a diameter of the first stage driven pulley is equal to or greater than 5 times a diameter of the drive pulley of the motor rotation shaft.

5. The electromechanical actuator package of claim 2, wherein a diameter of the second stage driven pulley is equal to or greater than 5 times a diameter of the second stage drive pulley.

6. The electromechanical actuator package of claim 1, further comprising a motor position sensor configured to sense a position of the motor rotor shaft, the motor position sensor disposed on the circuit board and facing the one end of the motor rotor shaft.

7. The electromechanical actuator package of claim 6, wherein the motor position sensor is positioned adjacent to a distal end of the motor rotor shaft.

8. The electromechanical actuator package of claim 6, wherein the motor position sensor is positioned on a first surface of the circuit board opposite to a second surface of the circuit board facing the inner surface of the housing.

9. The electromechanical actuator package of claim 1, wherein:
the first stage belt drive assembly comprises a first stage driven pulley, and
the shaft position sensor is configured to sense the position of the connecting shaft and/or the first stage driven pulley, the shaft position sensor facing one end of the connecting shaft and/or the first stage driven pulley.

10. The electromechanical actuator package of claim 9, wherein the shaft position sensor is positioned on a first surface of the circuit board opposite to a second surface of the circuit board facing the inner surface of the housing.

11. The electromechanical actuator package of claim 1, wherein the housing comprising:
a housing body enclosing at least a portion of the motor, at least a portion of the multi-stage belt drive mechanism and at least a portion of the circuit board;
a first cover affixed to one side of the body of the housing and covering at least a portion of the circuit board; and
a second cover affixed to another side of the body of the housing and covering at least a portion of the multi-stage belt drive mechanism.

12. The electromechanical actuator package of claim 1, wherein the housing body comprises:
a planar housing portion comprising a first cavity receiving the at least a portion of the multi-stage belt drive mechanism and/or at least a portion of the circuit board; and
a vertical housing portion extending from the planar housing portion in a direction perpendicular to a plane of the planar housing portion, the vertical housing portion comprising a cavity receiving at least a portion of the motor.

13. The electromechanical actuator package of claim 1, further comprising an electric connector formed on the housing and electrically connected to the circuit board and/or the motor.

14. The electromechanical actuator package of claim 13, wherein the electric connector comprises:

a connector housing configured to receive and connect with an external device; and
one or more electrical conductors extending from the connector housing to the circuit board and/or the motor.

15. The electromechanical actuator package of claim 1, wherein the circuit board is disposed perpendicular to the motor rotor shaft.

16. The electromechanical actuator package of claim 1, wherein a speed reduction ratio between a rotational speed of the motor rotor shaft and a rotational speed of the actuator output is equal to or greater than 25.

17. The electromechanical actuator package of claim 1, wherein the actuator output is configured to be connectable to a brake caliper.

18. The electromechanical actuator package of claim 1, wherein the actuator output is attachable to a ball screw mechanism of the brake assembly.

19. An electromechanical actuator package for actuating a brake assembly, comprising:
a motor comprising a motor rotor shaft, wherein the motor rotor shaft comprises a drive pulley;
a multi-stage belt drive mechanism connecting the motor rotor shaft to an actuator output via a plurality of drive belts, the actuator output associated with the brake assembly;
a circuit board; and
a housing enclosing the motor, the multi-stage belt drive mechanism and the circuit board, wherein the circuit board is positioned between one end of the motor rotor shaft and an inner surface of the housing,
wherein a diameter of the drive pulley is smaller than a diameter of the motor rotor shaft.

20. An electromechanical actuator package for actuating a brake assembly, comprising:
a motor comprising a motor rotor shaft;
a multi-stage belt drive mechanism connecting the motor rotor shaft to an actuator output via a plurality of drive belts, the actuator output associated with the brake assembly;
a circuit board; and
a housing enclosing the motor, the multi-stage belt drive mechanism and the circuit board, wherein the circuit board is positioned between one end of the motor rotor shaft and an inner surface of the housing,
wherein the multi-stage belt drive mechanism comprises a first stage belt drive assembly, a second stage belt drive assembly, and a connecting shaft operably connecting the first stage belt drive assembly to the second stage belt drive assembly, and
wherein the actuator output is disposed between the motor rotor shaft and the connecting shaft.

* * * * *